United States Patent
Alladi et al.

(10) Patent No.: US 10,839,252 B2
(45) Date of Patent: Nov. 17, 2020

(54) SYSTEM AND METHOD FOR COLOR INVARIANT FEATURE MATCHING

(71) Applicant: HONEYWELL INTERNATIONAL INC., Morris Plains, NJ (US)

(72) Inventors: Abhishek Alladi, Karnataka (IN); Debabrata Pal, West Bengal (IN); Luke Zeleznak, Peoria, AZ (US); Parag R Rao, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 126 days.

(21) Appl. No.: 16/128,758

(22) Filed: Sep. 12, 2018

(65) Prior Publication Data
US 2020/0082211 A1    Mar. 12, 2020

(51) Int. Cl.
G06K 9/62      (2006.01)
G06T 7/90      (2017.01)
G06T 7/73      (2017.01)

(52) U.S. Cl.
CPC .............. G06K 9/6215 (2013.01); G06T 7/74 (2017.01); G06T 7/90 (2017.01); G06K 2009/6213 (2013.01); G06T 2207/10024 (2013.01)

(58) Field of Classification Search
CPC .......................... G06K 9/6215; G06K 9/4661
See application file for complete search history.

(56) References Cited

U.S. PATENT DOCUMENTS

| | | | |
|---|---|---|---|
| 6,990,233 B2 | 1/2006 | Park et al. | |
| 7,920,714 B2 | 4/2011 | O'Neil | |
| 8,103,097 B2 | 1/2012 | Finlayson | |
| 8,983,170 B2 | 3/2015 | Nepomniachtchi et al. | |
| 9,661,299 B2 | 5/2017 | Stauder et al. | |
| 9,672,606 B2 | 6/2017 | Hattori et al. | |
| 9,710,491 B2 | 7/2017 | Ke et al. | |
| 2003/0083850 A1 | 5/2003 | Schmidt et al. | |
| 2010/0125356 A1* | 5/2010 | Shkolnik | B33Y 80/00 700/98 |

(Continued)

FOREIGN PATENT DOCUMENTS

EP    2889833 A1    7/2015

OTHER PUBLICATIONS

Galar, M., et al.; Aggregation functions to combine RGB color channels in stereo matching; © 2012 Optical Society of America.

(Continued)

*Primary Examiner* — Myron Wyche
(74) *Attorney, Agent, or Firm* — Lorenz & Kopf, LLP

(57) ABSTRACT

A method of verifying graphical objects using color invariant feature matching is provided. The method comprises determining, for each of a plurality of primary color channels, a color value for each inlier pixel in an actual object for that primary color channel; determining, for each color channel, a color difference factor (CDF) for an expected object by comparing, for each of the plurality of primary color channels, the color value for each inlier pixel in the expected object to the color value for each corresponding inlier pixel in the actual object; determining a false point value for the expected object from the CDF; and determining that the expected object matches the actual object when the false point value for the expected object is lower than the false point value for other expected objects.

20 Claims, 5 Drawing Sheets

(56) References Cited

U.S. PATENT DOCUMENTS

2015/0278224 A1   10/2015  Jaber et al.
2015/0324662 A1*  11/2015  Garg ................... G06K 9/4661
                                                                         382/165
2018/0000415 A1*   1/2018  Gupta ................... A61B 5/684

OTHER PUBLICATIONS

Sirmacek, B., et al.; Building detection from aerial images using invariant color features and shadow information Published by IEEE in "Computer and Information Sciences, 2008. ISCIS '08. 23rd International Symposium on" ISBN: 978-1-4244-2880-9, DOI:10.1109/ISCIS.2008.4717854.

Buluswar, S.D., et al.; Color machine vision for autonomous vehicles; Reference: http://www.cs.colostate.edu/~draper/papers/buluswar_ijeaai98.pdf.

Gavilan, D., et al.; "Color Blobs-Based Image Retrieval in Broad Domains", IEIC Technical Report (Institute of Electronics, Information and Communication Engineers), vol. 104, No. 544, Jan. 1, 2005, pp. 43-48, XP55004962.

Gevers, T., et al.; Image Segmentation and Similarity of Color-Texture Objects; IEEE Transactions on Multimedia, vol. XX, No. Y, Month 2002.

* cited by examiner

SYSTEM AND METHOD FOR COLOR INVARIANT FEATURE MATCHING

TECHNICAL FIELD

The technology described in this patent document relates generally to object recognition and more particularly to processor implemented, color-based object recognition.

BACKGROUND

Software verification of graphical objects on synthetic vision and enhanced vision displays can be challenging. The graphical objects may include objects such as an aircraft symbol, rectangular objects, circular dials, a mountain area, a sea and ground combination, a hilly area and shallow areas. In cases where a display contains overlay images (e.g., height of a mountain overlaid on the mountain image) it can be difficult to extract the overlaid data, such as readouts, alerts, text and other symbols, that may be displayed over a natural object, such as mountains and water bodies. It can also be difficult to recognize non-overlaid objects that may appear with varying color. Existing algorithms for object recognition, such as Scale Invariant Feature Transform (SIFT), Speeded Up Robust Feature (SURF), Maximally Stable Extremal Regions (MSER), Binary Robust Invariant Scalable Key points (BRISK), and Fast Retina key point (FREAK) algorithms are unable to accurately recognize an object when color is involved, and when an object changes its color in addition to position.

These algorithms perform object recognition on a grayscale image that has been converted from a color image. Consequently, these algorithms may erroneously match an actual object to an expected object that is of a different color. This may occur because various graphical objects may have the same or similar grayscale values even though they are displayed in different colors. For example, according to one conversion formula, a grayscale value $X=0.2989*(r)+0.5870*(g)+0.1140*(b)$, wherein (r) is equal to the red color value, (g) is equal to the green color value, and (b) is equal to the blue color value. A green variant color (0, 170, 0), a red variant color (230, 53, 0), a blue variant color (80, 83, 240) and a purple variant color (230, 14, 200), using the example grayscale formula, will each produce a grayscale value approximately equal to (X=100) when converted to grayscale. An algorithm that compares color objects by comparing their grayscale equivalents may not be able to discriminate graphics screenshot output when the shape of the object is the same but the color of the object represents different annunciations.

Accordingly, it is desirable to provide an approach to recognizing graphic objects using a color invariant technique. Furthermore, other desirable features and characteristics of the present invention will become apparent from the subsequent detailed description of the invention and the appended claims, taken in conjunction with the accompanying drawings and the background of the invention.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a processor-implemented method for verification of graphical objects in an actual image using color invariant feature matching is provided. The method includes identifying interest points from an actual image; identifying an actual object of interest by identifying inlier pixels from the identified interest points; determining, for each of a plurality of primary color channels, a color value for each inlier pixel in the actual object for that primary color channel; determining, for each color channel, a color difference factor (CDF) for an expected object by comparing, for each of the plurality of primary color channels, the color value for each inlier pixel in the expected object to the color value for each corresponding inlier pixel in the actual object; determining a false point value for the expected object from the CDF; determining that the expected object does not match the actual object when the false point value for the expected object exceeds a first threshold value; determining that the expected object does match the actual object when the false point value for the expected object is less than a second threshold value; and displaying the expected object as a match to the actual object of interest when it is determined that the expected object matches the actual object of interest.

In another embodiment, a non-transitory computer readable storage medium embodying programming instructions configurable to perform a method is provided. The method comprises determining, for each of a plurality of primary color channels, a color value for each inlier pixel in an actual object for that primary color channel; determining, for each color channel, a color difference factor (CDF) for an expected object by comparing, for each of the plurality of primary color channels, the color value for each inlier pixel in the expected object to the color value for each corresponding inlier pixel in the actual object; determining a false point value for the expected object from the CDF; determining that the expected object does not match the actual object when the false point value for the expected object exceeds a first threshold value; determining that the expected object does match the actual object when the false point value for the expected object is less than a second threshold value; and determining that the expected object does match the actual object when the false point value for the expected object does not exceed the threshold value and when the false point value for the expected object is lower than the false point value for one or more other expected objects.

In another embodiment, a graphical object verification system configured for verification of graphical objects in an actual image using color invariant feature matching is provided. The system comprises an object verification module. The object verification module comprises one or more processors configured by programming instructions on non-transient computer readable media. The object verification module is configured to determine, for each of a plurality of primary color channels, a color value for each inlier pixel in the actual object for that primary color channel; determine, for each color channel, a color difference factor (CDF) for an expected object by comparing, for each of the plurality of primary color channels, the color value for each inlier pixel in the expected object to the color value for each corresponding inlier pixel in the actual object; determine a false point value for the expected object from the CDF; determine that the expected object does not match the actual object when the false point value for the expected object exceeds a first threshold value; determine that the expected object does match the actual object when the false point value for the expected object is less than a second threshold value; and determine that the expected object does match the actual object when the false point value for the expected object does not exceed the threshold value and when the false point value for the expected object is lower than the false point value for one or more other expected objects.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Aspects of the present disclosure are best understood from the following detailed description when read with the accompanying figures, wherein like numerals denote like elements, and wherein.

DETAILED DESCRIPTION

The subject matter described herein discloses apparatus, systems, techniques, methods, and articles for automatically recognizing graphic objects using a color invariant technique. The following detailed description is merely exemplary in nature and is not intended to limit the invention or the application and uses of the invention. As used herein, the word "exemplary" means "serving as an example, instance, or illustration." Thus, any embodiment described herein as "exemplary" or "example" is not necessarily to be construed as preferred or advantageous over other embodiments. All embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, summary, or the following detailed description.

Described are apparatus, systems, techniques, methods, and articles for processor-implemented comparison of color objects. The described apparatus, systems, techniques, methods, and articles may allow for the color comparison of multiple expected images to an actual image, the ranking of the expected images, and the selection of the expected image that best matches the actual image. The described apparatus, systems, techniques, methods, and articles may allow a user to select a matching object based on the comparison results.

The described apparatus, systems, techniques, methods, and articles can reduce false positive matches. The described apparatus, systems, techniques, methods, and articles can allow object matching even when the background can vary from transparent to opaque (a normal behavior in the case of synthetic images).

Figure 1:
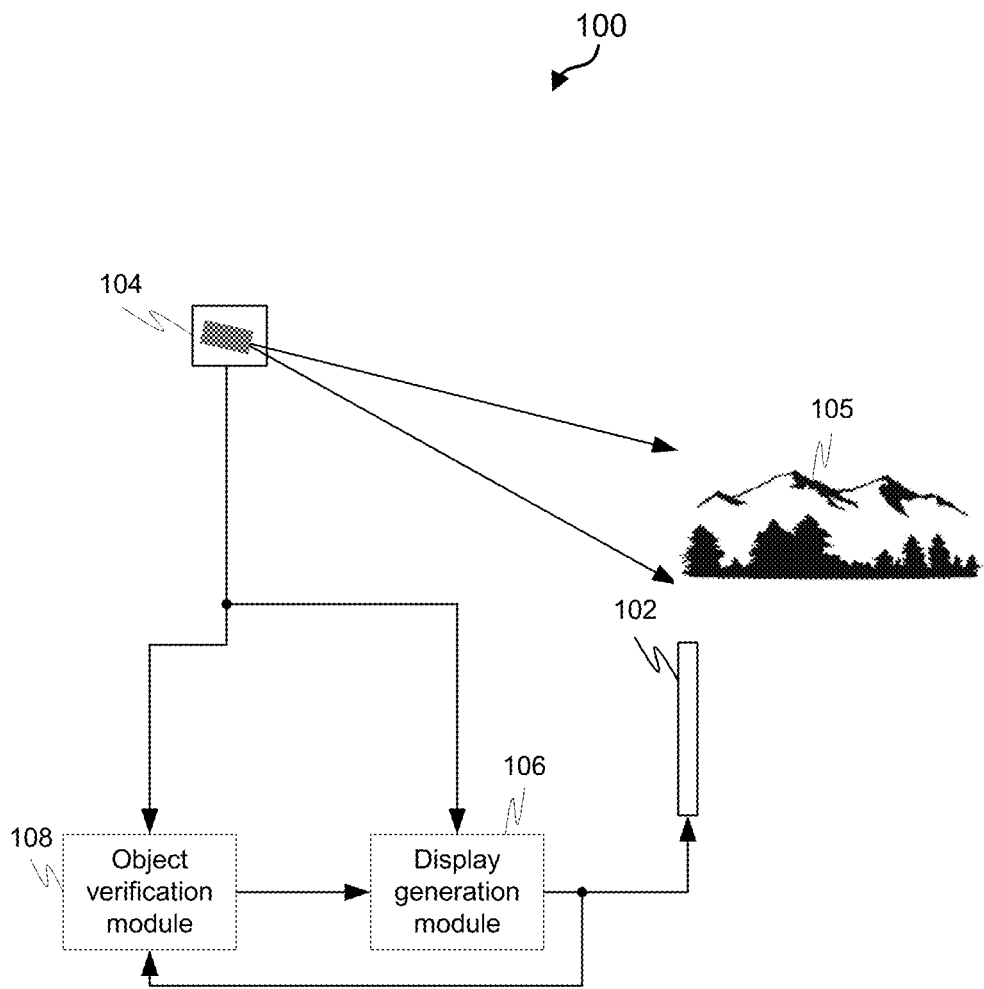
FIG. 1 is a diagram depicting an example operating environment within which an example object verification system may be utilized, in accordance with some embodiments.

FIG. 1 is a diagram depicting an example operating environment 100 within which an example object verification system may be utilized. The example operating environment 100 includes a display device 102, an imaging system 104, a display generation module 106, and an object verification module 108. The example operating environment 100 may be on an aircraft or some other vehicle.

The example display device 102 may comprise a head down display (HDD) configured to display imagery and/or overlays on imagery. The example display device 102 may also comprise a see-through display (e.g., an electronic display that allows the user to see what is shown on the screen while still being able to see through it). An example see-through display may comprise a display device such as a head-mounted display (or helmet-mounted display) that allows symbology to be displayed on a screen through which a user views the outside world. An example see-through display may comprise a heads-up display (HUD), such as those used in aircraft and automobiles, or other screens that allow a user to see through them to view the outside world and that also allow overlays containing symbology to be displayed thereon.

The example imaging system 104 may include a visible light camera, infrared camera, and/or an enhanced vision system. The example imaging system 104 is configured to capture an image of a surrounding environment 105 and provide the captured image for display on the display device 102.

The example display generation module 106 is configured to cause the display of the captured images on the display device 102. The example display generation module 106 is also configured to cause the display of symbology as overlays on the display device 102.

The example object verification module 108 is configured to identify graphical objects displayed on the display device 102 using a color invariant feature matching technique. The example object verification module 108 is configured to determine color characteristics of an object of interest, compare the color characteristics to the color characteristics of a plurality of potentially matching objects, rank the potentially matching objects based on how closely their color characteristics match the color characteristics of the object of interest, and choose the potentially matching object with the best match as a matching object when the color deviation between the actual object of interest and the potentially matching object is below a threshold level. The example object verification module 108 is also configured to provide the matching object for display on a display device (e.g., display device 102 or some other display device).

Figure 2:
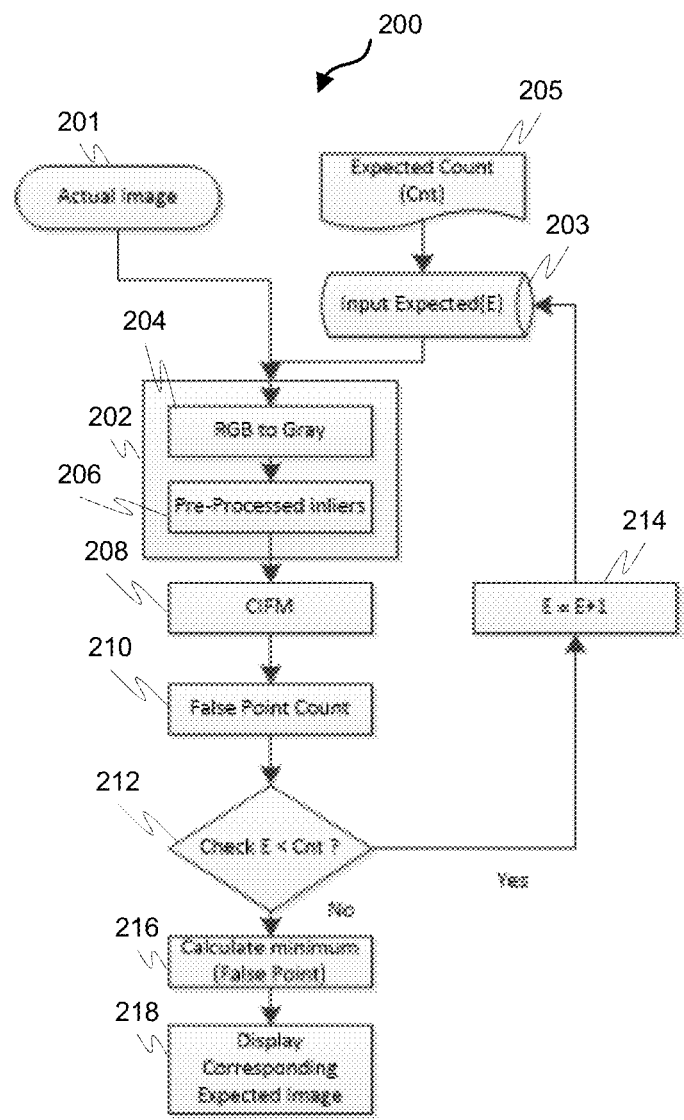
FIG. 2 is a process flow chart depicting an example process in an object verification module for verifying objects, in accordance with some embodiments.

FIG. 2 is a process flow chart depicting an example process 200 in an object verification module for verifying objects. The order of operation within the process 200 is not limited to the sequential execution as illustrated in the figure, but may be performed in one or more varying orders as applicable and in accordance with the present disclosure.

In the example process 200, object verification is performed by matching an actual object that is displayed on a display device to one of a plurality of potential expected objects stored in a database. An actual image 201 is input to a pre-processing block 202 and a potential expected object from an expected object database 203 is also input to the pre-processing block 202. The expected object database 203 includes a number of potential expected objects which can be identified by an expected count (Cnt) 205.

In the example pre-processing block 202, the actual image 201 is converted to a grayscale image via an RGB to grayscale block 204. The grayscale image is processed in a pre-processed inliers block 206 to identify actual points of interest (pre-processed inliers). Similarly, the potential expected object (e.g., potential expected object (E), wherein E is an integer value between 1 and Cnt) is processed in the pre-processing block 202 to identify inlier points that correspond to the pre-processed inliers associated with the actual image 201.

In the example process 200, in a CIFM block 208, the pre-processed inliers associated with the actual image 201 are compared to the inlier points associated with potential expected object (E) using a color invariant feature matching (CIFM) technique to identify differences in pixel colors between the pre-processed inliers associated with the actual image 201 and the inlier points associated with potential expected object (E). In the example CIFM block 208, for each of a plurality of primary colors (e.g., red, green, blue), a color value is determined for each pixel in the pre-processed inliers associated with the actual image 201, and a color value is determined for each pixel in the inlier points associated with potential expected object (E).

In the example process 200, in false point count block 210, a false point count value is determined for the potential expected object (E). The differences between the determined color value for each pixel in the pre-processed inliers associated with the actual image 201 and the determined color value for each pixel in the inlier points associated with potential expected object (E) are used to determine the false point count value for the potential expected object.

In the example process 200, a determination is made, at decision block 212, regarding whether additional potential expected objects exist that have not been compared to the actual object using the CIFM technique. If additional potential expected objects exist (yes at decision block 212), then E is incremented (at block 214), the next potential expected object (E) is processed in pre-processing block 202, the pre-processed inliers associated with the actual image 201 are compared to the inlier points associated with potential expected object (E) using a color invariant feature matching (CIFM) technique at CIFM block 208, and a false point count value is determined for the potential expected object (E) at false point count block 210.

If additional potential expected objects do not exist (no at decision block 212), then the potential expected object (E) with the lowest false point count is selected as a match to the actual image at calculate minimum false point count block 216. The selected potential expected object (E) may be displayed at display corresponding expected image block 218.

Figure 3A:
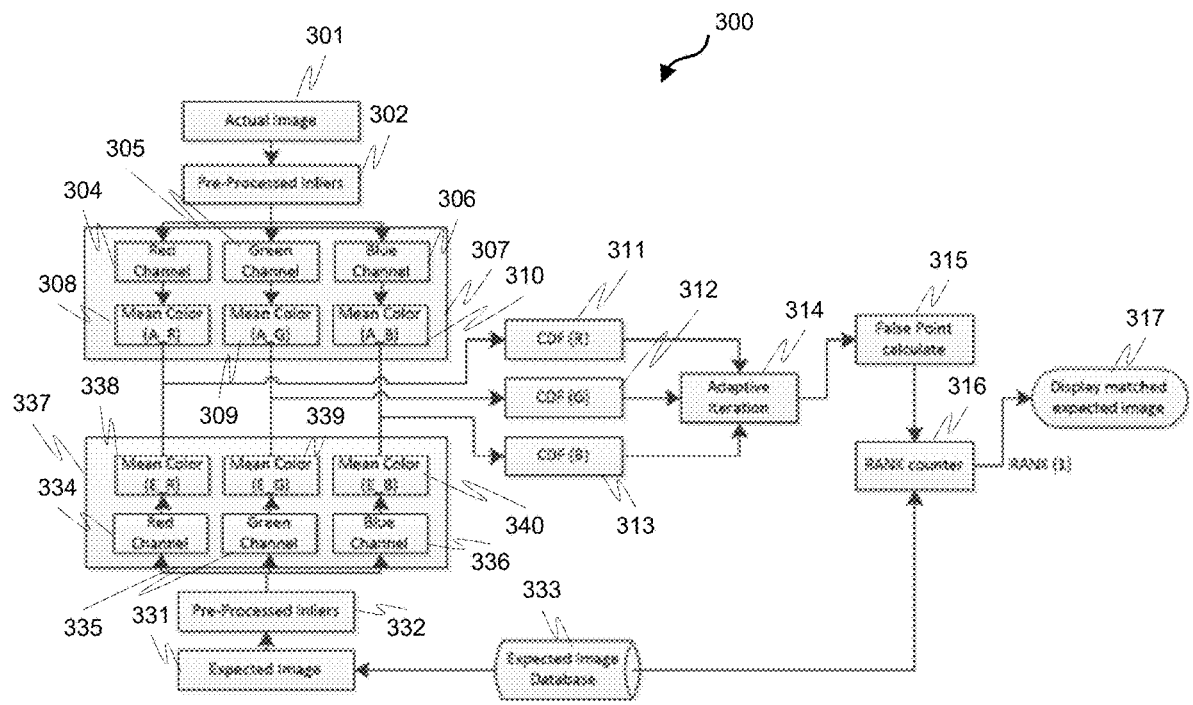
FIG. 3A is a process flow chart depicting another example process in an object verification module for verifying objects, in accordance with some embodiments.

FIG. 3A is a process flow chart depicting another example process 300 in an object verification module for verifying objects. The order of operation within the process 300 is not limited to the sequential execution as illustrated in the figure, but may be performed in one or more varying orders as applicable and in accordance with the present disclosure.

In the example process 300, object verification is performed by matching an actual object that is displayed on a display device to one of a plurality of potential expected objects stored in a database. An actual image 301 is input to a pre-processing block 302 to identify pre-processed inlier pixels, and a potential expected object 331 from an expected object database 333 is input to a pre-processing block 332 to identify pre-processed inlier pixels. The expected object database 333 includes a plurality of potential expected objects.

The pre-processed inlier pixels from pre-processing block 302 are processed by primary color channel channels 304, 305, 306 in a color space 307, and the pre-processed inlier pixels from pre-processing block 332 are processed by primary color channel channels 334, 335, 336 in a color space 337. In this example, the primary colors are red, green, and blue, but in other examples other primary colors may be used. Each pre-processed inlier pixel is processed by each of its associated primary color channels (i.e., each pre-processed inlier pixel from pre-processing block 302 are processed by each of primary color channel channels 304, 305, 306 in color space 307 and each pre-processed inlier pixel from pre-processing block 332 are processed by each of primary color channel channels 334, 335, 336 in color space 337). The processing results in, for each inlier pixel, a color value for the inlier pixel in each of the primary colors.

Figure 3B:
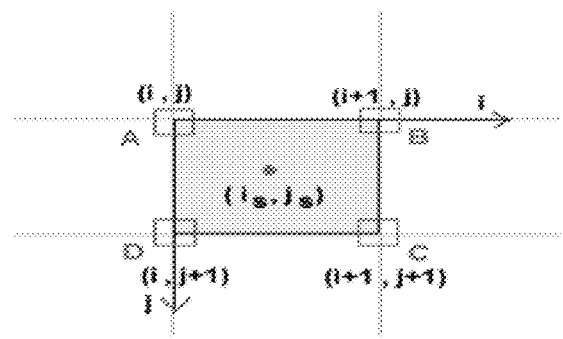
FIG. 3B is a diagram depicting an environment for calculating the mean color of a pixel, in accordance with some embodiments.

The color value, in this example, is determined by calculating a mean color at a sub-pixel coordinate for the pixel at a mean color block 308, 309, 310 in color space 307 and by calculating a mean color at a sub-pixel coordinate for the pixel at a mean color block 338, 339, 340 in color space 337. As illustrated in FIG. 3B, mean color is defined at the sub-pixel coordinate $(i_s, j_s)$ retrieved after pre-processing through any feature matching techniques as the mean of color value of four neighbourhood integer points located at (A,B,C,D) for each respective color channel (e.g., R, G, B). The corresponding value of this parameter in the actual image should have the exact value for the corresponding location of the sub-pixel in the expected image. The sub-pixel coordinate lies between $(i \leq i_s \leq i+1, j \leq j_s \leq j+1)$. Sub-pixel $(i_s, j_s)$ can reside anywhere inside or on the boundary as shown in FIG. 3B.

A Color Difference Factor (CDF) vector is generated, at CDF blocks (311, 312, 313), for each color channel (e.g., R, G, B) wherein each entry in the CDF vector contains the mean color difference between corresponding inlier pixels from pre-processing block 302 (inlier pixels from the actual Image) and inlier pixels from pre-processing block 332 (inlier pixels from the expected image). The following Equations (1) and (2) provide an example definition of CDF.

$$CDF_{Clr} = E_{i=1}^{N} MC_{Act} - MC_{Exp} \qquad (1)$$

Where,
  $CDF_{Clr}$ is Color Difference Factor for corresponding Color channel (e.g., R, G, B)
  N is Number of inliers generated after pre-processing
  $MC_{Act}$ is Mean Color for actual Image
  $MC_{Exp}$ is Mean Color for Expected Image $$CDF = [CDF_R, CDF_G, CDF_B] \qquad (2)$$

Where,
  $CDF_R$ is Color Difference Factor for Red Color Channel
  $CDF_G$ is Color Difference Factor for Green Color Channel
  $CDF_R$ is Color Difference Factor for Blue Color Channel
  Listed below are example CDF calculations for a 10 Pixel (Feature Point) example. Consider below values for example $CDF_{red}$ calculation:
    $MC_{Act}$(red Channel)=[22,23,25,34,45,55,66,27,50,40];
    $MC_{Exp}$(red Channel)=[22,23,25,34,43,50,66,27,50,40];
    $CDF_{red}$=Vector of (0,0,0,0,2,5,0,0,0,0);
    $CDF_{green}$ and $CDF_{blue}$ are similarly calculated.

After CDF determination, an Adaptive Iteration (AI) value is determined, at AI block 314. The AI value is used to identify the number of iterations that are used when calculating a false point value for an expected image when compared to the actual image. The following Equation (3) provides an example definition for calculating an AI value.

$$AI = \max[\max(CDF_R), \max(CDF_G), \max(CDF_B)] + 1 \quad (3)$$

A constant '1' is added, in this example, to iterate at least once in case of exact match between actual and expected image. To identify a match, at least one iteration is required.

Listed below are example AI calculations:
Max($CDF_R$)=5, from above $CDF_{red}$ calculation
Consider, Max($CDF_{green}$)=8; Max($CDF_{blue}$)=0

$$AI = \max[\max(CDF_R), \max(CDF_G), \max(CDF_B)] + 1$$

$$AI = \max[5,8,0] + 1 = 9$$

After AI value determination, a false point value is determined, at false point block 315, for each expected object. In this example, for the number of iterations determined by the AI value for the expected object, a false point value for the expected object is calculated in accordance with the following Equation (4).

$$\Sigma_{i=1}^{AI} \Sigma_{j=1}^{L} (CDF_{R(j)} > i) + (CDF_{G(j)} > i) + (CDF_{B(j)} > i) \quad (4)$$

Where, AI is adaptive iteration;
L is the length of the $CDF_{clr}$ vector.
j is the index for iteration of 1 to L or vector length
For each iteration number (i, where i=1 to AI):

False points=False points+[sum($CDF_R$>i)+sum($CDF_G$>i)+sum($CDF_B$>i)]

Listed below are example False Point calculations for the Red Channel:
$CDF_{red}$=[0,0,0,0,2,5,0,0,0,0]:
When i=1: sum($CDF_R$>1)=2 as only 2 values (2,5) in the Vector are greater than the present iteration no. [Note—it is not 2+5=7]
i=2: sum($CDF_R$>2)=1 as only 1 value (5) in the Vector is greater than present iteration no. [Note—it is not 5]
i=3: sum($CDF_R$>3)=1 as only 1 value (5) in the Vector is greater than present iteration no. [Note—it is not 5]
i=4: sum($CDF_R$>4)=1 as no value in the Vector is greater than present iteration no.
i=5: sum($CDF_R$>5)=0 as no value in the Vector is greater than present iteration no.
i=6: sum($CDF_R$>6)=0 as no value in the Vector is greater than present iteration no.
i=7: sum($CDF_R$>7)=0 as no value in the Vector is greater than Present iteration no.
i=8: sum($CDF_R$>8)=0 as no value in the Vector is greater than present iteration no.
i=9: sum($CDF_R$>9)=0 as no value in the Vector is greater than present iteration no.
Iteration stops here as calculated adaptive iteration is 9.

Hence False Point Calculation for Red Channel only=$\Sigma_{i=1}^{AI} \Sigma_{j=1}^{L} (CDF_{R(j)} > 1)$=sum[2,1,1,1,0,0,0,0,0]=5

To calculate False points for an expected object, all 3 channels are considered. For illustrative purposes, calculations for only one channel were shown.

After false point value determination, each expected object is ranked at rank counter 316 according to its false point value wherein the expected object with the lowest false point value is ranked first (e.g., Rank-1). As the false point value increases, the rank of the expected images increase indicating a mis-match. The higher the rank, the higher the mis-match. The possibility of a tie condition between expected objects are minimized through the use of adaptive iteration. The expected objects that do not sufficiently match the actual object may be discarded by introducing a false point threshold value. Those expected objects having a false point value above a threshold value may be disregarded. This can reduce processing time since these expected objects may not be ranked.

In sum, after pre-processing of the actual image and expected image are complete, the potential expected images from the expected image database and the actual image are split into primary color channels (e.g., red, green, blue) (at blocks 337, 307, respectively). A mean color is calculated at each sub-pixel inlier location for each color channel for both the actual and the expected images (at blocks 307, 337, respectively). For each expected object, three CDF vectors are generated, one for each primary color channel, which store the difference between the mean color value for the pixels in the actual image and the expected image. An adaptive iteration value is calculated for each expected object (at block 314), and false point values are calculated iteratively for the length of adaptive iteration value for each expected image. Expected images are ranked based on their false point value and the expected image with the lowest false point value is identified as the matched image. The matched image can be displayed at block 317.

Figure 4:
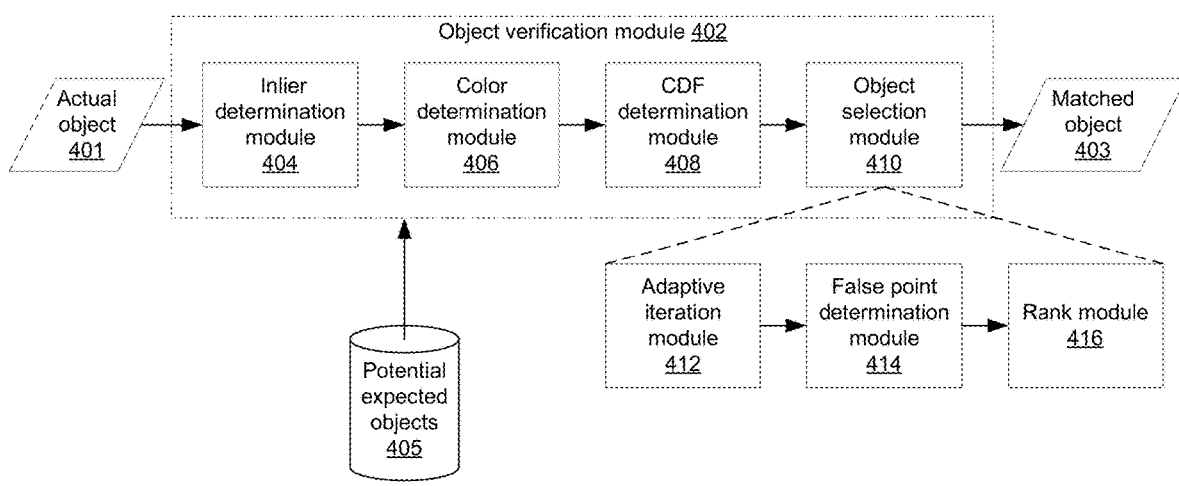
FIG. 4 is a block diagram depicting an example object verification module, in accordance with some embodiments.

FIG. 4 is a block diagram depicting an example object verification module 402. The example object verification module 402 is configured to receive actual object data 401 and access a database to retrieve expected image data 405. The example object verification module 402 is configured to determine which, if any, of the expected image data 405 matches the actual object data 401 and cause the display of the matching expected image data 403 for confirmation. The example object verification module 402 includes an inlier determination module 404, a mean color determination module 406, a CDF determination module 408, and an object selection module 410, and is implemented by a controller.

The example controller includes at least one processor and a computer-readable storage device or media. The processor may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller. The instructions may include one or more separate programs, each of which comprises an ordered listing of executable instructions for implementing logical functions. The instructions, when executed by the processor, receive and process signals, perform logic, calculations, methods and/or algorithms for controlling the object verification module 402.

The example inlier determination module 404 is configured to identify inlier pixels from an actual image. The inlier points from an actual image may be identified through converting the actual image to a greyscale image view and identifying inlier pixels from the greyscale image view.

The example mean color determination module 406 is configured to determine, for each of a plurality of primary color channels, a color value for each inlier pixel in the actual object 401 for that primary color channel. The primary color channels may include a red channel, a green channel, and a blue channel. To determine a color value for each inlier pixel in the actual object 401 for a primary color channel, the example mean color determination module 406 is configured to determine a color value for each inlier pixel in the actual object 401 in the red channel, determine a color value for each inlier pixel in the actual object 401 in the green channel, and determine a color value for each inlier pixel in the actual object 401 in the blue channel. The example mean color determination module 406 is configured to store the color value for each inlier pixel in the actual object 401 in the red channel in a red channel vector, store the color value for each inlier pixel in the actual object 401 in the green channel in a green channel vector, and store the color value for each inlier pixel in the actual object 401 in the blue channel in a blue channel vector.

The example mean color determination module 406 is also configured to determine, for each of the plurality of primary color channels, a color value for each inlier pixel in an expected object 405 for that primary color channel. To determine a color value for each inlier pixel in an expected object 405 for a primary color channel, the example mean color determination module 406 is configured to determine a color value for each inlier pixel in the expected object 405 in the red channel, determine a color value for each inlier pixel in the expected object 405 in the green channel, and determine a color value for each inlier pixel in the expected object 405 in the blue channel. The example mean color determination module 406 is configured to store the color value for each inlier pixel in the expected object 405 in the red channel in a red channel vector, store the color value for each inlier pixel in the expected object 405 in the green channel in a green channel vector, and store the color value for each inlier pixel in the expected object 405 in the blue channel in a blue channel vector.

The example CDF determination module 408 is configured to determine, for each color channel, a color difference factor (CDF) for an expected object 405 by comparing, for each of the plurality of primary color channels, the color value for each inlier pixel in the expected object 405 to the color value for each corresponding inlier pixel in the actual object 401. The example CDF determination module 408 is configured to determine, for each color channel, a color difference factor for an expected object 405 in accordance with Equation (1) listed above. The CDF for a primary color, in this example, is a vector that identifies for each pixel in an expected object 405 whether the pixel color for that pixel matches the pixel color for a corresponding pixel in a region of interest in the actual object 401. The example CDF determination module 408 is configured to determine an overall color difference factor for an expected object 405 in accordance with Equation (2) listed above. The CDF determination module 408, in some implementations, is configured to determine a CDF for a region of interest in the inlier points such that a CDF is not determined for all inlier points but instead for selected inlier points that fall within the region of interest. In these implementations, the CDF determination module 408 is configured to determine, for each color channel, a color difference factor for the region of interest in an expected object 405 in accordance with Equation (1) listed above, and the CDF determination module 408 is configured to determine an overall color difference factor for the region of interest in an expected object 405 in accordance with Equation (2) listed above.

The example object selection module 410 is configured to select which, if any, of a plurality of potential expected objects 405 is a match to the actual object 401 and output the matched object 403. The example object selection module 410 is configured to select a match to the actual object 401, using the determined CDF for potential expected objects 405. The example object selection module 410 includes an adaptive iteration module 412, a false point determination module 414, and a rank module 416.

The example adaptive iteration module 412 is configured to calculate an AI value. The AI value is used to identify the number of iterations that are used when calculating a false point value for an expected object 405 when compared to an actual image. The example adaptive iteration module 412 is configured to calculate an AI value in accordance with Equation (3) listed above. The adaptive iteration module 412, in other implementations, may be configured to use other formulations to calculate an AI value. The use of adaptive iteration in calculating a false point value can reduce the likelihood that two or more expected objects 405 will obtain the same false count value. In some implementations, adaptive iteration, however, may not be used in calculating a false point value.

The example false point determination module 414 is configured to determine a false point value for the expected object 405 (or region of interest in the expected object 405) from the CDF. The example false point determination module 412 is configured to determine a false point value for the expected object 405 (or region of interest in the expected object 405) by summing the number of entries in the CDF that identifies a color mismatch. The example false point determination module 414 is configured to determine a false point value in accordance with Equation (4) listed above. The false point determination module 414, in other implementations, may be configured to use other formulations to determine a false point value. In some implementations, adaptive iteration, however, may not be used in calculating a false point value.

The example rank module 416 is configured to provide a ranking to expected objects based on their CDF and/or false point value and identify an expected object 405 that best matches the actual object 401 based on the CDF and/or false point value of the expected object 405. The example rank module 416 is configured to rank an expected object 405 with a rank value identifying the expected object 405 as a matched object 403 when the false point count identifies the expected object 405 as an exact match to the actual object 401. The example rank module 416 is configured to rank an expected object 405 with a rank value identifying the expected object 405 as a matched object 403 when the false point count identifies the expected object 405 as having the lowest false point count of any of the other expected objects 405 that have a determined CDF value. The example rank module 416 is configured to not rank an expected object 405 with a rank value when the false point count of the expected object 405 exceeds a threshold false count level. This can help save processing time within the object verification module 402.

A region of interest may encircle one or more gaps, wherein the one or more gaps include one or more pixels that are not included in the region of interest. The example rank module 416 is configured to identify an expected object 405 that best matches the actual object 401 even when background image colors in the actual object 401 are visible within the one or more gaps. The example rank module 416 is configured to identify an expected object 405 that best matches the actual object 401 even when the actual object 401 is on a transparent background.

Figure 5:
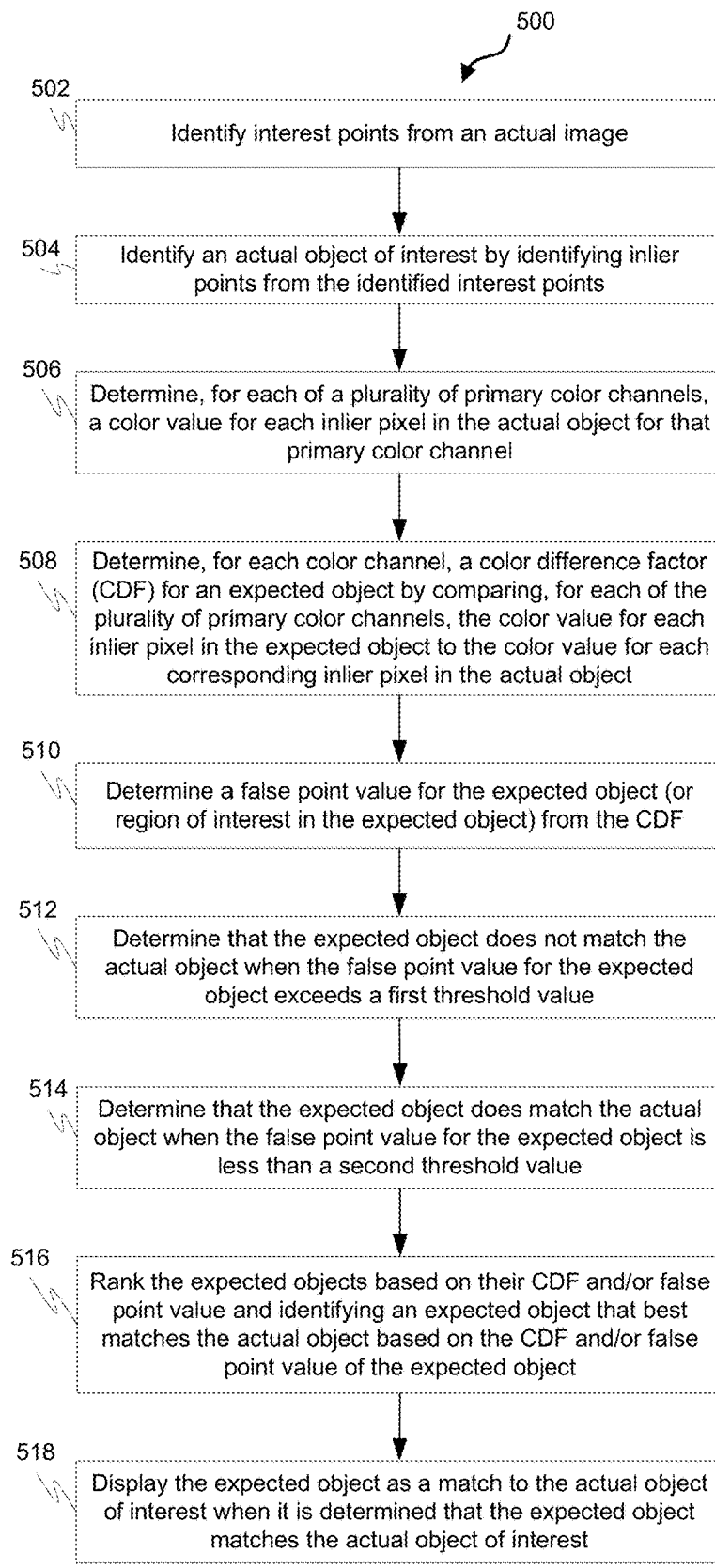
FIG. 5 is a process flow chart depicting an example process for verification of graphical objects in an actual image using color invariant feature matching, in accordance with some embodiments.

FIG. 5 is a process flow chart depicting an example process 500 for verification of graphical objects in an actual image using color invariant feature matching. The order of operation within the process 500 is not limited to the sequential execution as illustrated in the figure, but may be performed in one or more varying orders as applicable and in accordance with the present disclosure.

The example process 500 includes identifying interest points from an actual image (operation 502). Identifying interest points from an actual image may comprise converting the actual image to a greyscale image view and identifying interest points from the greyscale image view.

The example process 500 includes identifying an actual object of interest by identifying inlier points from the identified interest points (operation 504). Identifying an actual object of interest by identifying inlier points from the identified interest points may comprise identifying points in the actual image that correspond to the identified interest points from the greyscale image view and removing outlier points from the identified points in the actual image.

The example process 500 includes determining, for each of a plurality of primary color channels, a color value for each inlier pixel in the actual object for that primary color channel (operation 506). The primary color channels may include a red channel, a green channel, and a blue channel. Determining, for each of a plurality of primary color channels, a color value for each inlier pixel in the actual object for that primary color channel may comprise determining a color value for each inlier pixel in the actual object in the red channel, determining a color value for each inlier pixel in the actual object in the green channel, and determining a color value for each inlier pixel in the actual object in the blue channel. The determining may further comprise storing the color value for each inlier pixel in the actual object in the red channel in a red channel vector, storing the color value for each inlier pixel in the actual object in the green channel in a green channel vector, and storing the color value for each inlier pixel in the actual object in the blue channel in a blue channel vector.

The determining may further comprise determining, for each of the plurality of primary color channels, a color value for each inlier pixel in an expected object for that primary color channel. Determining, for each of a plurality of primary color channels, a color value for each inlier pixel in the expected object for that primary color channel may comprise determining a color value for each inlier pixel in the expected object in the red channel, determining a color value for each inlier pixel in the expected object in the green channel, and determining a color value for each inlier pixel in the expected object in the blue channel. The determining may further comprise storing the color value for each inlier pixel in the expected object in the red channel in a red channel vector, storing the color value for each inlier pixel in the expected object in the green channel in a green channel vector, and storing the color value for each inlier pixel in the expected object in the blue channel in a blue channel vector.

The example process 500 further includes determining, for each color channel, a color difference factor (CDF) for an expected object by comparing, for each of the plurality of primary color channels, the color value for each inlier pixel in the expected object to the color value for each corresponding inlier pixel in the actual object (operation 508). The determining, for each color channel, a color difference factor (CDF) for an expected object may comprise determining, for each color channel, a color difference factor for an expected object in accordance with Equation (1) listed above. The CDF for a primary color, in this example, is a vector that identifies for each pixel in an expected object whether the pixel color for that pixel matches the pixel color for a corresponding pixel in a region of interest in the actual object. The determining, for each color channel, a color difference factor (CDF) for an expected object may comprise determining, an overall color difference factor for an expected object in accordance with Equation (2) listed above. The determining, for each color channel, a color difference factor (CDF) for an expected object may comprise determining a CDF for a region of interest in the inlier points such that a CDF is not determined for all inlier points but instead for selected inlier points that fall within the region of interest. Determining a CDF for a region of interest may comprise determining, for each color channel, a color difference factor for the region of interest in an expected object in accordance with Equation (1) listed above, and determining an overall color difference factor for the region of interest in an expected object in accordance with Equation (2) listed above.

The example process 500 includes determining a false point value for the expected object (or region of interest in the expected object) from the CDF (operation 510). Determining a false point value for the expected object (or region of interest in the expected object) from the CDF may comprise summing the number of entries in the CDF that identifies a color mismatch. Determining a false point value for the expected object (or region of interest in the expected object) from the CDF may comprise determining a false point value in accordance with Equation (4) listed above. Adaptive iteration may or may not be used in calculating a false point value.

When adaptive iteration is used, the process 500 includes calculating an AI value to identify the number of iterations that are used when calculating a false point value for an expected object when compared to an actual image. An AI value may be calculated in accordance with Equation (3) listed above. The use of adaptive iteration in calculating a false point value can reduce the likelihood that two or more expected objects will obtain the same false count value.

The example process 500 includes determining that the expected object does not match the actual object when the false point value for the expected object exceeds a first threshold value (operation 512). The example process 500 includes determining that the expected object does match the actual object when the false point value for the expected object is less than a second threshold value (operation 514). For example, in the case of a false count value of zero, the example process may determine that the expected object matches the actual object.

The example process 500 includes ranking the expected objects based on their CDF and/or false point value and identifying an expected object that best matches the actual object based on the CDF and/or false point value of the expected object (operation 516). The ranking may comprise ranking an expected object with a rank value identifying the expected object as a matched object when the false point count identifies the expected object as an exact match to the actual object. The ranking may comprise ranking an expected object with a rank value identifying the expected object as a matched object when the false point count identifies the expected object as having the lowest false point count of any of the other expected objects that have a determined CDF value. The ranking may comprise not ranking an expected object when the false count value of the expected object exceeds a third threshold value. This can help save processing time within the process.

A region of interest may encircle one or more gaps, wherein the one or more gaps include one or more pixels that are not included in the region of interest, and the identifying an expected object that best matches the actual object may include determining that the expected object matches the actual object when background image colors in the actual object are visible within the one or more gaps. The identifying an expected object that best matches the actual object may also include determining that the expected object matches the actual object when the actual object is on a transparent background.

The example process 500 optionally includes displaying the expected object as a match to the actual object of interest when it is determined that the expected object matches the actual object of interest (operation 518).

Described are apparatus, systems, techniques, methods, and articles for processor-implemented comparison of color objects. The described apparatus, systems, techniques, methods, and articles may allow for the color comparison of multiple expected images to an actual image, the ranking of the expected images, and the selection of the expected image that best matches the actual image. The described apparatus, systems, techniques, methods, and articles may allow a user to select a matching object based on the comparison results.

In one embodiment, a processor-implemented method for verification of graphical objects in an actual image using color invariant feature matching is provided. The method comprises identifying interest points from an actual image; identifying an actual object of interest by identifying inlier pixels from the identified interest points; determining, for each of a plurality of primary color channels, a color value for each inlier pixel in the actual object for that primary color channel; determining, for each color channel, a color difference factor (CDF) for an expected object by comparing, for each of the plurality of primary color channels, the color value for each inlier pixel in the expected object to the color value for each corresponding inlier pixel in the actual object; determining a false point value for the expected object from the CDF; determining that the expected object does not match the actual object when the false point value for the expected object exceeds a first threshold value; determining that the expected object does match the actual object when the false point value for the expected object is less than a second threshold value; and displaying the expected object as a match to the actual object of interest when it is determined that the expected object matches the actual object of interest.

These aspects and other embodiments may include one or more of the following features. The method may further comprise determining that the expected object does match the actual object when the false point value for the expected object does not exceed the threshold value and when the false point value for the expected object is lower than the false point value for one or more other expected objects. The plurality of primary color channels may include a red channel, a green channel, and a blue channel. Determining, for each of a plurality of primary color channels, a color value for each inlier pixel in the actual object for that primary color channel may comprise determining a color value for each inlier pixel in the actual object in the red channel, determining a color value for each inlier pixel in the actual object in the green channel, and determining a color value for each inlier pixel in the actual object in the blue channel. The identifying interest points from an actual image may comprise converting the actual image to a greyscale image view and identifying interest points from the greyscale image view. The identifying an actual object of interest by identifying inlier points from the identified interest points may comprise identifying points in the actual image that correspond to the identified interest points from the greyscale image view and removing outlier points from the identified points in the actual image. The determining, for each color channel, a color difference factor (CDF) for an expected object may comprise: determining a CDF for a region of interest in the inlier points such that a CDF is not determined for all inlier points but instead for selected inlier points that fall within the region of interest; and comparing, for each of the plurality of primary color channels, the color value for each inlier pixel in the region of interest in the actual object to the color value for each corresponding inlier pixel in the expected object. The region of interest may encircle one or more gaps, wherein the one or more gaps comprise one or more pixels that are not included in the region of interest; and the determining that the expected object does match the actual object may include determining that the expected object matches the actual object when background image colors in the actual object are visible within the one or more gaps. The determining that the expected object does match the actual object may include determining that the expected object matches the actual object when the actual object is on a transparent background. The CDF for a primary color may be a vector that identifies for each pixel in an expected object whether the pixel color for that pixel matches the pixel color for a corresponding pixel in a region of interest in the actual object, and the determining a false point value for the expected object from the CDF may comprise summing the number of entries in the CDF that identifies a color mismatch.

In another embodiment, a non-transitory computer readable storage medium embodying programming instructions configurable to perform a method is provided. The method comprises determining, for each of a plurality of primary color channels, a color value for each inlier pixel in an actual object for that primary color channel; determining, for each color channel, a color difference factor (CDF) for an expected object by comparing, for each of the plurality of primary color channels, the color value for each inlier pixel in the expected object to the color value for each corresponding inlier pixel in the actual object; determining a false point value for the expected object from the CDF; determining that the expected object does not match the actual object when the false point value for the expected object exceeds a first threshold value; determining that the expected object does match the actual object when the false point value for the expected object is less than a second threshold value; and determining that the expected object does match the actual object when the false point value for the expected object does not exceed the threshold value and when the false point value for the expected object is lower than the false point value for one or more other expected objects.

These aspects and other embodiments may include one or more of the following features. The method may further comprise: identifying interest points from an actual image;

and identifying an actual object of interest by identifying inlier pixels from the identified interest points. The determining, for each color channel, a color difference factor (CDF) for an expected object may comprise: determining a CDF for a region of interest in the inlier points such that a CDF is not determined for all inlier points but instead for selected inlier points that fall within the region of interest; and comparing, for each of the plurality of primary color channels, the color value for each inlier pixel in the region of interest in the actual object to the color value for each corresponding inlier pixel in the expected object. The region of interest may encircle one or more gaps, wherein the one or more gaps comprise one or more pixels that are not included in the region of interest; and the determining that the expected object does match the actual object may include determining that the expected object matches the actual object when background image colors in the actual object are visible within the one or more gaps. The determining that the expected object does match the actual object may include determining that the expected object matches the actual object when the actual object is on a transparent background. The CDF for a primary color may be a vector that identifies for each pixel in an expected object whether the pixel color for that pixel matches the pixel color for a corresponding pixel in a region of interest in the actual object, and determining a false point value for the expected object from the CDF may comprise summing the number of entries in the CDF that identifies a color mismatch.

In another embodiment, a graphical object verification system configured for verification of graphical objects in an actual image using color invariant feature matching is provided. The system comprises an object verification module. The object verification module comprises one or more processors configured by programming instructions on non-transient computer readable media. The object verification module is configured to determine, for each of a plurality of primary color channels, a color value for each inlier pixel in the actual object for that primary color channel; determine, for each color channel, a color difference factor (CDF) for an expected object by comparing, for each of the plurality of primary color channels, the color value for each inlier pixel in the expected object to the color value for each corresponding inlier pixel in the actual object; determine a false point value for the expected object from the CDF; determine that the expected object does not match the actual object when the false point value for the expected object exceeds a first threshold value; determine that the expected object does match the actual object when the false point value for the expected object is less than a second threshold value; and determine that the expected object does match the actual object when the false point value for the expected object does not exceed the threshold value and when the false point value for the expected object is lower than the false point value for one or more other expected objects.

These aspects and other embodiments may include one or more of the following features. To determine, for each color channel, a color difference factor (CDF) for an expected object, the object verification module may be configured to: determine a CDF for a region of interest in the inlier points such that a CDF is not determined for all inlier points but instead for selected inlier points that fall within the region of interest; and compare, for each of the plurality of primary color channels, the color value for each inlier pixel in the region of interest in the actual object to the color value for each corresponding inlier pixel in the expected object. The region of interest may encircle one or more gaps, wherein the one or more gaps comprise one or more pixels that are not included in the region of interest; and the determining that the expected object does match the actual object may include determining that the expected object matches the actual object when background image colors in the actual object are visible within the one or more gaps. The CDF for a primary color may be a vector that identifies for each pixel in an expected object whether the pixel color for that pixel matches the pixel color for a corresponding pixel in a region of interest in the actual object, and determining a false point value for the expected object from the CDF may comprise summing the number of entries in the CDF that identifies a color mismatch.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention if such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A processor-implemented method for verification of graphical objects in an actual image using color invariant feature matching, the method comprising:
   identifying interest points from an actual image;
   identifying an actual object of interest by identifying inlier pixels from the identified interest points;
   determining, for each of a plurality of primary color channels, a color value for each inlier pixel in the actual object for that primary color channel;
   selecting an expected object from a plurality of predetermined objects stored in a data store;
   determining, for each color channel, a color difference factor (CDF) vector for the expected object by comparing, for each of the plurality of primary color channels, the color value for each inlier pixel in the expected object to the color value for each corresponding inlier pixel in the actual object, wherein the CDF vector identifies for each pixel in the expected object whether the pixel color for that pixel matches the pixel color for a corresponding pixel in the actual object;
   determining a false point value for the expected object from the CDF vector for each color channel by summing the number of entries in the CDF vector for each color channel that identifies a color mismatch;
   determining that the expected object does not match the actual object when the false point value for the expected object exceeds a first threshold value;
   determining that the expected object does match the actual object when the false point value for the expected object is less than a second threshold value; and
   displaying the expected object as a match to the actual object of interest when it is determined that the expected object matches the actual object of interest.

2. The method of claim 1, further comprising determining that the expected object does match the actual object when the false point value for the expected object does not exceed the threshold value and when the false point value for the expected object is lower than the false point value for one or more other predetermined objects from the plurality of predetermined objects stored in the data store.

3. The method of claim 1, wherein the plurality of primary color channels includes a red channel, a green channel, and a blue channel.

4. The method of claim 3, wherein determining, for each of a plurality of primary color channels, a color value for each inlier pixel in the actual object for that primary color channel comprises determining a color value for each inlier pixel in the actual object in the red channel, determining a color value for each inlier pixel in the actual object in the green channel, and determining a color value for each inlier pixel in the actual object in the blue channel.

5. The method of claim 1, wherein the identifying interest points from an actual image comprises converting the actual image to a greyscale image view and identifying interest points from the greyscale image view.

6. The method of claim 5, wherein the identifying an actual object of interest by identifying inlier pixels from the identified interest points comprises identifying points in the actual image that correspond to the identified interest points from the greyscale image view and removing outlier points from the identified points in the actual image.

7. The method of claim 1, wherein the determining, for each color channel, a color difference factor (CDF) vector for the expected object comprises:
   determining a CDF vector for a region of interest in the inlier pixels such that a CDF vector is not determined for all inlier pixels but instead for selected inlier pixels that fall within the region of interest; and
   comparing, for each of the plurality of primary color channels, the color value for each inlier pixel in the region of interest in the actual object to the color value for each corresponding inlier pixel in the expected object.

8. The method of claim 7, wherein:
   the region of interest encircles one or more gaps, wherein the one or more gaps comprise one or more pixels that are not included in the region of interest; and
   the determining that the expected object does match the actual object includes determining that the expected object matches the actual object when background image colors in the actual object are visible within the one or more gaps.

9. The method of claim 1, wherein the summing the number of entries in the CDF vector that identifies a color mismatch comprises calculating the false point value for the expected object in accordance with the following equation:

$$\Sigma_{i=1}^{AI}\Sigma_{j=1}^{L}(CDF_{R(j)}>i)+(CDF_{G(j)}>i)+(CDF_{B(j)}>i)$$

where, AI is adaptive iteration; L is the length of the CDF vector; $CDF_R$ is the component of the CDF vector for a first color channel, $CDF_G$ is the component of the CDF vector for a second color channel, $CDF_B$ is the component of the CDF vector for a third color channel, j is the index for iteration of 1 to L; and For each iteration number i, (where i=1 to AI): the false point value for the current iteration=false point value for the prior iteration+[sum($CDF_R$>i)sum($CDF_G$>i)sum($CDF_B$>i)].

10. The method of claim 1, wherein the summing the number of entries in the CDF vector for each color channel comprises summing the number of entries for a determined number of iterations equal to an adaptive iteration value that identifies the number of iterations that are used when calculating a false point value.

11. A non-transitory computer readable storage medium embodying programming instructions configurable to cause a processor to perform a method, the method comprising:
  determining, for each of a plurality of primary color channels, a color value for each inlier pixel in an actual object for that primary color channel;
  selecting an expected object from a plurality of predetermined objects stored in a data store;
  determining, for each color channel, a color difference factor (CDF) vector for the expected object by comparing, for each of the plurality of primary color channels, the color value for each inlier pixel in the expected object to the color value for each corresponding inlier pixel in the actual object, wherein the CDF vector identifies for each pixel in the expected object whether the pixel color for that pixel matches the pixel color for a corresponding pixel in the actual object;
  determining a false point value for the expected object from the CDF vector for each color channel by summing the number of entries in the CDF vector for each color channel that identifies a color mismatch;
  determining that the expected object does not match the actual object when the false point value for the expected object exceeds a first threshold value;
  determining that the expected object does match the actual object when the false point value for the expected object is less than a second threshold value; and
  determining that the expected object does match the actual object when the false point value for the expected object does not exceed the threshold value and when the false point value for the expected object is lower than the false point value for one or more other predetermined objects from the plurality of predetermined objects.

12. The non-transitory computer readable storage medium of claim 11, wherein the method further comprises:
  identifying interest points from an actual image; and
  identifying an actual object of interest by identifying inlier pixels from the identified interest points.

13. The non-transitory computer readable storage medium of claim 11, wherein the determining, for each color channel, a color difference factor (CDF) vector for the expected object comprises:
  determining a CDF vector for a region of interest in the inlier pixels points such that a CDF vector is not determined for all inlier pixels but instead for selected inlier pixels that fall within the region of interest; and
  comparing, for each of the plurality of primary color channels, the color value for each inlier pixel in the region of interest in the actual object to the color value for each corresponding inlier pixel in the expected object.

14. The non-transitory computer readable storage medium of claim 13, wherein:
  the region of interest encircles one or more gaps, wherein the one or more gaps comprise one or more pixels that are not included in the region of interest; and
  the determining that the expected object does match the actual object includes determining that the expected object matches the actual object when background image colors in the actual object are visible within the one or more gaps.

15. The non-transitory computer readable storage medium of claim 11, wherein the summing the number of entries in the CDF vector that identifies a color mismatch comprises calculating the false point value for the expected object in accordance with the following equation:

$$\Sigma_{i=1}^{AI}\Sigma_{j=1}^{L}(CDF_{R(j)}>i)+(CDF_{G(j)}>i)+(CDF_{B(j)}>i)$$

where, AI is adaptive iteration; L is the length of the CDF vector; $CDF_R$ is the component of the CDF vector for a first color channel, $CDF_G$ is the component of the CDF vector for a second color channel, $CDF_B$ is the component of the CDF vector for a third color channel, j is the index for iteration of 1 to L; and For each iteration number i, (where i=1 to AI): the false point value for the current iteration=false point value for the prior iteration+[sum($CDF_R$>i)+sum($CDF_G$>i) sum($CDF_B$>i)].

16. The non-transitory computer readable storage medium of claim 11, wherein the summing the number of entries in the CDF vector for each color channel comprises summing the number of entries for a determined number of iterations equal to an adaptive iteration value that identifies the number of iterations that are used when calculating a false point value.

17. A graphical object verification system configured for verification of graphical objects in an actual image using color invariant feature matching, the system comprising an object verification module, the object verification module comprising one or more processors configured by programming instructions on non-transient computer readable media, the object verification module configured to:
  determine, for each of a plurality of primary color channels, a color value for each inlier pixel in the actual object for that primary color channel;
  select an expected object from a plurality of predetermined objects stored in a data store;
  determine, for each color channel, a color difference factor (CDF) vector for the expected object by comparing, for each of the plurality of primary color channels, the color value for each inlier pixel in the expected object to the color value for each corresponding inlier pixel in the actual object, wherein the CDF vector identifies for each pixel in the expected object whether the pixel color for that pixel matches the pixel color for a corresponding pixel in the actual object;
  determine a false point value for the expected object from the CDF vector for each color channel by summing the number of entries in the CDF vector for each color channel that identifies a color mismatch;
  determine that the expected object does not match the actual object when the false point value for the expected object exceeds a first threshold value;

determine that the expected object does match the actual object when the false point value for the expected object is less than a second threshold value; and determine that the expected object does match the actual object when the false point value for the expected object does not exceed the threshold value and when the false point value for the expected object is lower than the false point value for one or more other predetermined objects from the plurality of predetermined objects.

18. The graphical object verification system of claim 17, wherein to determine, for each color channel, a color difference factor (CDF) vector for the expected object, the object verification module is configured to:

determine a CDF vector for a region of interest in the inlier pixels such that a CDF vector is not determined for all inlier pixels but instead for selected inlier pixels that fall within the region of interest; and compare, for each of the plurality of primary color channels, the color value for each inlier pixel in the region of interest in the actual object to the color value for each corresponding inlier pixel in the expected object.

19. The graphical object verification system of claim 17, wherein:

the region of interest encircles one or more gaps, wherein the one or more gaps comprise one or more pixels that are not included in the region of interest; and the determining that the expected object does match the actual object includes determining that the expected object matches the actual object when background image colors in the actual object are visible within the one or more gaps.

20. The graphical object verification system of claim 17, wherein the summing the number of entries in the CDF vector for each color channel comprises summing the number of entries for a determined number of iterations equal to an adaptive iteration value that identifies the number of iterations that are used when calculating a false point value.

* * * * *